(12) United States Patent
Weng et al.

(10) Patent No.: US 6,225,432 B1
(45) Date of Patent: May 1, 2001

(54) BRANCHED POLYPROPYLENE COMPOSITIONS

(75) Inventors: Weiqing Weng, Houston; Eric J. Markel; Armenag H. Dekmezian, both of Kingwood; Palanisamy Arjunan, Houston, all of TX (US)

(73) Assignee: Exxon Chemical Patents Inc., Houston, TX (US)

( * ) Notice: Subject to any disclaimer, the term of this patent is extended or adjusted under 35 U.S.C. 154(b) by 0 days.

(21) Appl. No.: 09/375,774

(22) Filed: Aug. 17, 1999

Related U.S. Application Data

(63) Continuation of application No. 09/140,590, filed on Aug. 26, 1998.

(51) Int. Cl.[7] .................................................. C08F 110/06
(52) U.S. Cl. ........................ 526/351; 526/127; 526/160; 526/170; 526/155; 502/152
(58) Field of Search .................................. 526/160, 170, 526/351, 127, 155; 502/152

(56) References Cited

U.S. PATENT DOCUMENTS

| | | |
|---|---|---|
| 4,530,914 | 7/1985 | Ewen et al. ........................... 502/113 |
| 4,542,199 | 9/1985 | Kaminsky et al. ................... 526/160 |
| 4,543,399 | 9/1985 | Jenkins, III et al. .................. 526/70 |
| 4,588,790 | 5/1986 | Jenkins, III et al. .................. 526/70 |
| 4,665,208 | 5/1987 | Welborn, Jr. et al. ............... 556/179 |

(List continued on next page.)

FOREIGN PATENT DOCUMENTS

| | | |
|---|---|---|
| 2241812 | * 4/1997 | (CA) . |
| 0 190 889 | 8/1986 | (EP) . |
| 0 190 889 A2 | 8/1986 | (EP) . |
| 0 277 003 | 8/1988 | (EP) . |
| 0 277 004 | 8/1988 | (EP) . |

(List continued on next page.)

OTHER PUBLICATIONS

Scollard, et al, Sterically Demanding Diamide Ligands: Synthesis of Structure of d° Zirconium Alkyl Derivatives, *Organometallics*, v. 14, pp.5478–5480, (1995).

(List continued on next page.)

*Primary Examiner*—David W. Wu
*Assistant Examiner*—Ling-Siu Choi
(74) *Attorney, Agent, or Firm*—William G. Muller; Douglas W Miller; Charles E Ronyan

(57) ABSTRACT

Branched polypropylene compositions which have improved melt strength and good processability are provided. The branched polypropylene compositions of the present invention have a polydispersity of less than 4.0 and a melt point greater than 90° C. Further, the weight average branching index g of the polypropylene compositions is less than 0.95. Additionally, a novel process is provided for efficiently producing a branched polypropylene composition comprising:

a) contacting propylene monomers in a reactor with an inert hydrocarbon solvent or diluent and a catalyst composition comprising one or more single site catalyst compounds capable of producing stereospecific polypropylene at a temperature from about 40° C. to about 120° C., wherein the ratio in the reactor of the propylene monomers to the inert hydrocarbon solvent or diluent is less than 9.0, and further, wherein the propylene monomers and the inert hydrocarbon solvent or diluent comprise at least 50 weight percent of the total contents of the reactor; and b) recovering a branched polypropylene composition having a polydispersity of less than or equal to 4.0 and a melting point greater than 90° C. wherein the weight average branching index, g, of the branched polypropylene composition is less than 0.95.

28 Claims, 1 Drawing Sheet

U.S. PATENT DOCUMENTS

| | | | |
|---|---|---|---|
| 4,701,432 | 10/1987 | Welborn, Jr. | 502/113 |
| 4,808,561 | 2/1989 | Welborn, Jr. | 502/104 |
| 4,874,734 | 10/1989 | Kioka et al. | 502/104 |
| 4,892,851 | 1/1990 | Ewen et al. | 502/104 |
| 4,908,463 | 3/1990 | Bottelberghe | 556/179 |
| 4,921,825 | 5/1990 | Kioka et al. | 502/104 |
| 4,923,833 | 5/1990 | Kioka et al. | 502/9 |
| 4,924,018 | 5/1990 | Bottelberghe | 556/179 |
| 4,933,403 | 6/1990 | Kaminsky et al. | 526/160 |
| 4,937,299 | 6/1990 | Ewen et al. | 526/119 |
| 4,952,540 | 8/1990 | Kioka et al. | 502/9 |
| 4,968,827 | 11/1990 | Davis | 556/179 |
| 5,017,714 | 5/1991 | Welborn, Jr. | 556/12 |
| 5,028,670 | 7/1991 | Chinh et al. | 526/73 |
| 5,057,475 | 10/1991 | Canich et al. | 502/104 |
| 5,091,352 | 2/1992 | Kioka et al. | 502/103 |
| 5,103,031 | 4/1992 | Smith, Jr. | 556/179 |
| 5,120,867 | 6/1992 | Welborn, Jr. | 556/12 |
| 5,132,381 | 7/1992 | Winter et al. | 526/160 |
| 5,149,819 | 9/1992 | Satoh et al. | 548/149 |
| 5,155,080 | 10/1992 | Elder et al. | 502/152 |
| 5,157,137 | 10/1992 | Sangokoya | 556/179 |
| 5,198,401 | 3/1993 | Turner et al. | 502/155 |
| 5,204,419 | 4/1993 | Tsutsui et al. | 526/153 |
| 5,206,199 | 4/1993 | Kioka et al. | 502/117 |
| 5,235,081 | 8/1993 | Sangokoya | 556/179 |
| 5,239,022 | 8/1993 | Winter et al. | 526/127 |
| 5,240,894 | 8/1993 | Burkhardt et al. | 502/108 |
| 5,243,001 * | 9/1993 | Winter et al. | 526/127 |
| 5,248,801 | 9/1993 | Sangokoya | 556/179 |
| 5,276,208 | 1/1994 | Winter et al. | 556/53 |
| 5,278,119 | 1/1994 | Turner et al. | 502/155 |
| 5,296,434 | 3/1994 | Karl et al. | 502/117 |
| 5,304,614 | 4/1994 | Winter et al. | 526/127 |
| 5,308,815 | 5/1994 | Sangokoya | 502/104 |
| 5,318,935 | 6/1994 | Canich et al. | 502/117 |
| 5,324,800 | 6/1994 | Welborn, Jr. et al. | 526/160 |
| 5,328,969 * | 7/1994 | Winter et al. | 526/127 |
| 5,329,032 | 7/1994 | Tran et al. | 556/179 |
| 5,350,723 | 9/1994 | Neithamer et al. | 502/104 |
| 5,352,749 | 10/1994 | DeChellis et al. | 526/68 |
| 5,391,790 | 2/1995 | Rohrmann et al. | 556/28 |
| 5,405,922 | 4/1995 | DeChellis et al. | 526/68 |
| 5,436,304 | 7/1995 | Griffin et al. | 526/68 |
| 5,514,761 | 5/1996 | Etherton et al. | 526/144 |
| 5,541,236 | 7/1996 | DeNicola, Jr. et al. | 522/157 |
| 5,705,584 | 1/1998 | Fukuoka et al. | 526/160 |
| 5,945,367 | 8/1999 | Thiele et al. | |

FOREIGN PATENT DOCUMENTS

| | | |
|---|---|---|
| 0 320 762 | 6/1989 | (EP) . |
| 0 426 637 | 5/1991 | (EP) . |
| 0 495 375 | 7/1992 | (EP) . |
| 0 500 944 | 9/1992 | (EP) . |
| 0 279 863 | 10/1992 | (EP) . |
| 0 520 732 | 12/1992 | (EP) . |
| 0 561 476 | 9/1993 | (EP) . |
| 0 570 982 | 11/1993 | (EP) . |
| 0 573 403 | 12/1993 | (EP) . |
| 0 594 218 | 4/1994 | (EP) . |
| 0 279 586 | 5/1994 | (EP) . |
| 0 354 893 | 11/1994 | (EP) . |
| 0 384 431 | 11/1994 | (EP) . |
| 0 678 527 A2 | 10/1995 | (EP) . |
| 0 718 324 A2 | 6/1996 | (EP) . |
| WO 91/09882 | 7/1991 | (WO) . |
| WO 92/00333 | 1/1992 | (WO) . |
| WO 94/03506 | 2/1994 | (WO) . |
| WO 94/07928 | 4/1994 | (WO) . |
| WO 94/07930 | 4/1994 | (WO) . |
| WO 94/10180 | 5/1994 | (WO) . |
| WO 94/28034 | 12/1994 | (WO) . |
| WO 96/00243 | 1/1996 | (WO) . |
| WO 96/00245 | 1/1996 | (WO) . |
| WO 96/04319 | 2/1996 | (WO) . |
| WO 97/02276 | 1/1997 | (WO) . |
| WO 97/11775 | 4/1997 | (WO) . |

OTHER PUBLICATIONS

Repo, et al, Metallocene Dichlorides Bearing Acenaphthyl Substitued Cyclopentadienyl Rings: Preparation and Polymerization Behavior, *Journal of Organometallic Chemistry*, v.549, pp. 177–186, (1997).

vol. 1, *Experimental Methods in Catalyst Research*, Academic Press (1968), pp. 67–99.

Britovsek, et al, "Novel Olefin Polymerization Catalysts Based on Iron and Cobalt"—*Chem. Commun.*, (1998), pp. 849–850.

Johnson, et al, "New PD(II)–and Ni(II)–Based Catalysts for Polymerization of Ethylene and αOlefins"—*J. American Chem Soc*, v.117 (1995), pp. 6414–6415.

Small, et al, "Highly Active Iron and Cobalt Catalysts for the Polymerization of Ethylene"—*J. American Chem. Soc.*, v.120 (1998), pp. 4049–4050.

"The Dimensions of Chain Molecules Containnig Branches and Rings", Zimm, et al, *The Journal of Chemical Physics.*, v.17, pp. 1301–1314, (1949).

"ansa–Metallocene Derivatives: VII. Synthesis and Crystal Structure Of A Chiral ansa–Zirconocene Derivative With Ethylene–Bridged Tetrahydroinenyl Ligands", *Journal of Organometallic Chemistry*, v.288, pp. 63–67, (1985).

* cited by examiner

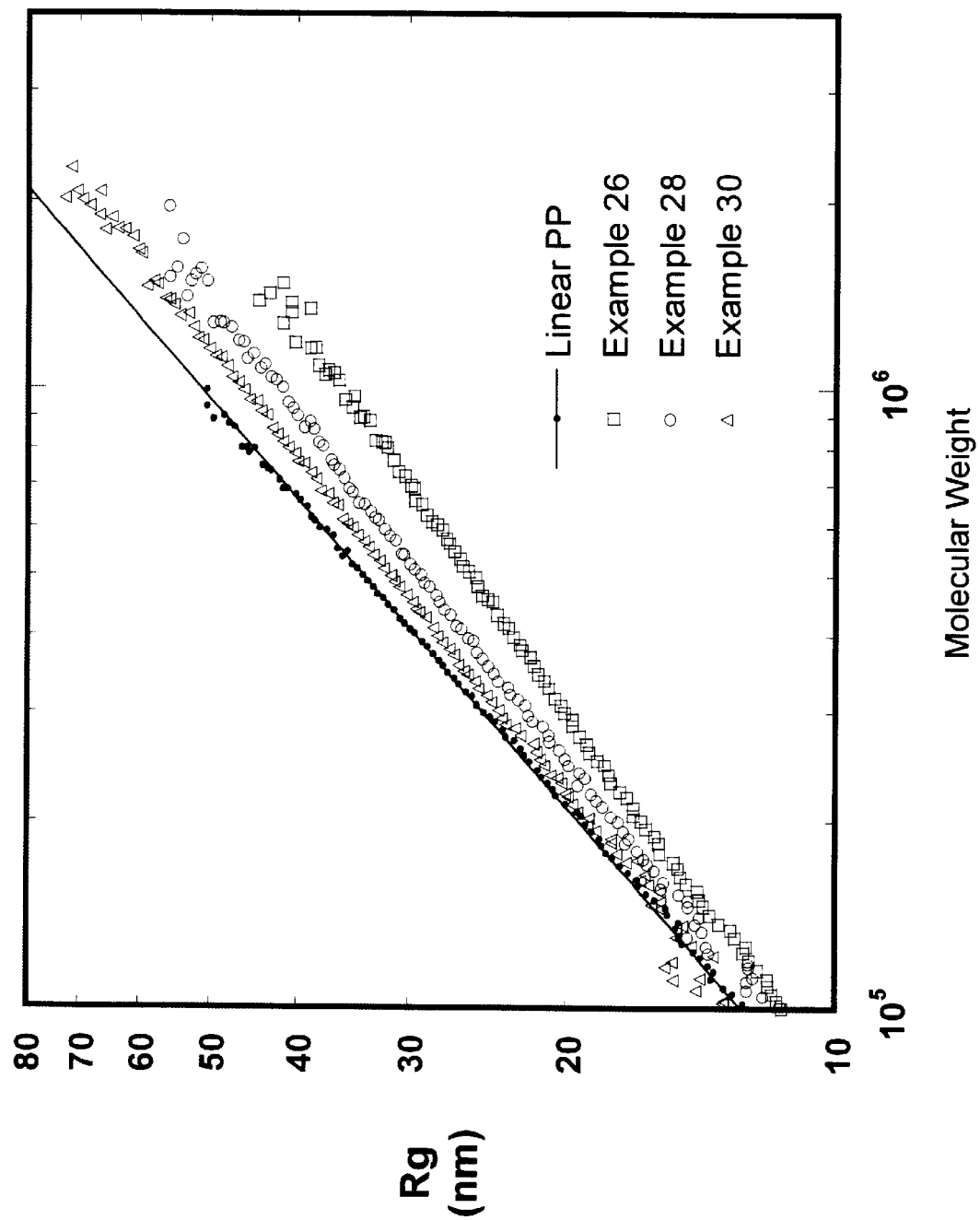
Figure 1. GPC-MALLS Analysis of Branched Polypropylene Compositions

BRANCHED POLYPROPYLENE COMPOSITIONS

RELATED APPLICATIONS

This application is cont. U.S. Ser. No. 09/140,590 filed Aug. 26, 1998.

FIELD OF THE INVENTION

The present invention relates to branched polypropylene compositions and a method for the preparation of branched polypropylene utilizing single site catalyst compounds.

BACKGROUND OF THE INVENTION

Polypropylene and related polymers are known to have low melt strength. This is a significant deficiency in key application areas such as thermoforming, foaming, and blow molding. Polyethylene on the other hand is used extensively in blown film applications requiring good melt strength. The limitations in the melt strength of polypropylenes show up as excess sag in sheet extrusion, rapid thinning of walls in parts thermoformed in the melt phase, low draw-down ratios in extrusion coating, poor bubble formation in extrusion foam materials, and relative weakness in large-part blow molding. Thus, it would be highly desirable to produce polypropylene and related polymers having enhanced melt strength as well as commercially valuable processability.

Increasing the melt strength of polymers such as polypropylene has been an industrial goal for well over ten years. However, success has been limited. The desirable properties that have made low density polyethylene commercially successful are attributed in large part to high melt strength and excellent processability. Both of these properties are attributed to the presence of long chain branching, which is thought to occur under high pressure polymerization conditions.

There has been some success in increasing the melt strength of polypropylene. For example, EP 190 889 A2 discloses high energy irradiation of polypropylene to create what is believed to be polypropylene having substantial free-end long branches of propylene units. EP 384 431 discloses the use of peroxide decomposition of polypropylene in the substantial absence of oxygen to obtain a similar product.

Other attempts to improve the melt properties of polypropylene include U.S. Pat. No. 5,441,236, which introduces long chain branching by bridging two PP backbones to form H-type polymers, and U.S. Pat. No. 5,514,761, which uses dienes incorporated in the backbones to achieve a similar effect. However, cross-linking and gel formation can occur in such processes. In addition, these techniques introduce additional process steps which result in a more complex and expensive process.

Thus, there is still a need for propylene polymers having improved melt strength and good processability which can be produced efficiently.

SUMMARY OF THE INVENTION

The present invention meets that need by providing branched polypropylene compositions which have improved melt strength and good processability. The branched polypropylene compositions of the present invention have a polydispersity of less than or equal 4.0, and a melting point greater than 90° C. Further, the weight average branching index, g, of the polypropylene compositions is less than 0.95. Additionally, a novel process is provided for efficiently producing a branched polypropylene composition comprising:

a) contacting propylene monomers in a reactor with an inert hydrocarbon solvent or diluent and a catalyst composition comprising one or more single site catalyst compounds capable of producing stereospecific polypropylene at a temperature from about 40° C. to about 120° C., wherein the ratio in the reactor of the propylene monomers to the inert hydrocarbon solvent or diluent is less than 9.0, and further, wherein the propylene monomers and the inert hydrocarbon solvent or diluent comprise at least 50 percent of the total contents of the reactor; and b) recovering a branched polypropylene composition having a polydispersity of less than or equal to 4.0 and a melting point greater than 90° C. wherein the weight average branching index, g, of the branched polypropylene composition is less than 0.95.

BRIEF DESCRIPTION OF THE DRAWINGS

FIG. 1 is a graphic illustration of the relationship between the Radius of Gyration ($R_g$) and the molecular weight for the polymer product produced in Examples 26, 28 and 30.

DETAILED DESCRIPTION OF THE INVENTION

The present invention provides a novel method for producing branched polypropylene which is simpler and more efficient than current techniques. In addition, the branched polypropylene product of the present invention is novel. It has a polydispersity of less than or equal to 4.0 and a melting point greater than 90° C. Further, the weight average branching index, g, of the polypropylene composition is less than 0.95. Preferably, the weight average branching index, g, of the polypropylene composition is less than 0.90. More preferably, it is less than 0.85. In a preferred embodiment, the branched polypropylene product has a polydispersity of less than 3.0. These branching characteristics result in a polymer with improved melt strength and strain thinning characteristics.

In a preferred embodiment, the strain hardening ratio of the branched polypropylene product is greater than 2.0 for strain rates of 0.1 to 0.5 1/s. More preferably, the strain hardening ratio of the branched polypropylene product is greater than 4.0 for strain rates of 0.1 to 0.5 1/s. Still more preferably, the strain hardening ratio of the branched polypropylene product is greater than 5.0 for strain rates of 0.1 to 0.5 1/s. Most preferably, the strain hardening ratio of the branched polypropylene product is greater than 6.0 for strain rates of 0.1 to 0.5 1/s.

"Strain Hardening Ratio" is defined as the ratio of two extensional viscosities: the numerator measured using an extensional viscometer reporting the maximum viscosity (at break), and the denominator being an extensional viscosity calculated from small amplitude strain experimental data using the method of Baumgaertel and Winter. It is understood that the two extensional viscosities are measured using the same experimental conditions (i.e. temperature, stabilization, etc.).

For the purposes of this invention, the amount of branching is determined using the weight average branching index g of the branched polypropylene. The branching index g is defined as $g=[Rg]^2_{br}/[Rg]^2_{lin}$. It is well known in the art that as the g value decreases, branching increases. "Rg" stands for Radius of Gyration, and is measured using Multi-Angle Laser Light Scattering (MALLS) equipment. "$[Rg]_{br}$" is the Radius of Gyration for the branched polymer sample and "$[Rg]_{lin}$" is the Radius of Gyration for a linear polymer sample.

Long chain branching is inferred when the polymer radius of gyration deviates from that measured for a linear polymer. The average deviation level was calculated from GPC/DRI/-MALLS data using the procedure outlined below. First, the GPC/MALLS/DRI data was used to measure molecular weight averages ($M_w$, $M_z$) and to measure polymer radius of gyration as a function of absolute molecular weight. For polypropylene polymers, the MALLS measurement of Rg is particularly sensitive in the range from 100,000 Daltons to about 2,000,000 Daltons. For this reason, the data was then truncated outside this range. Weight-average values of g (defined as $Rg^2$ (branched)/$Rg^2$ (linear)) were calculated from the data points that fall in the range of from the characteristic $M_w$ of the polymer examined to the upper limit of 2,000,000 Daltons. For any case in which some values of $M_w$ that are below 100,000 Daltons, the weight average is calculated using only those points between 100,000 Daltons and 2,000,000 Daltons.

Production of the branched polypropylene of the present invention is less complicated than previously reported branched polypropylenes. Prior art processes typically required some type of post-reactor treatment to produce a branched product. The present invention does not need a post-reactor step to produce branched polypropylene. The process conditions used to produce the branched polypropylene of the present invention are described in detail below.

Catalysts

Catalysts which are useful for producing the branched polypropylene of the present invention include single-site catalysts which are capable of producing stereospecific polypropylene. Stereospecific polypropylene is defined as polypropylene which is either isotactic or syndiotactic. Alternately the catalysts used may be a non-stereospecific catalysts for such obvious variants as atactic polypropylene. Preferably, the single-site catalysts of the present invention are capable of producing isotactic polypropylene.

As used herein, "isotactic polypropylene" is defined as having at least 70% isotactic pentads according to analysis by 13C—NMR. "Highly isotactic polypropylene" is defined as having at least 90% isotactic pentads according to analysis by 13C—NMR. "Syndiotactic polypropylene" is defined as polypropylene having at least 70% syndiotactic pentads according to analysis by 13C—NMR. Preferably, the polypropylene of the present invention is highly isotactic.

The term "single site" as used herein refers to the ability to produce essentially homogeneous polymers; i.e., those having narrow molecular weight distribution and uniform comonomer incorporation where comonomer here includes polymerizable polypropylene macromers.

Preferably, metallocene catalysts are used to produce the branched polypropylene of the present invention. As used herein, "metallocene" refers generally to compounds represented by the formula $Cp_mMR_nX_q$ wherein Cp is a cyclopentadienyl ring which may be substituted, or derivative thereof which may be substituted, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X is a halogen, and m=1–3, n=0–3, q=0–3, and the sum of m+n+q is equal to the oxidation state of the transition metal.

Methods for making and using metallocenes are well known in the art. For example, metallocenes are detailed in U.S. Pat. Nos. 4,530,914; 4,542,199; 4,769,910; 4,808,561; 4,871,705; 4,892,851; 4,933,403; 4,937,299; 5,017,714; 5,057,475; 5,120,867; 5,132,381; 5,155,080; 5,198,401; 5,278,119; 5,304,614; 5,324,800; 5,350,723; and 5,391,790 each fully incorporated herein by reference.

Preferred metallocenes are those that are stereorigid and comprise a Group 4, 5, or 6 transition metal, biscyclopentadienyl derivative, preferably bis-indenyl metallocene components having the following general structure:

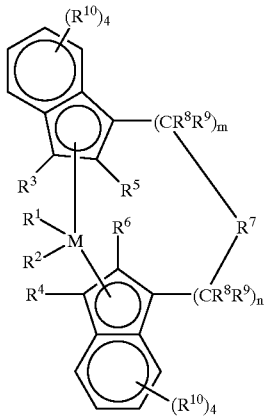

wherein $M^1$ is a metal of Group 4, 5, or 6 of the Periodic Table, for example titanium, zirconium, hafnium, vanadium, niobium, tantalum, chromium, molybdenum and tungsten, preferably, zirconium, hafnium and titanium, most preferably zirconium and hafnium;

$R^1$ and $R^2$ are identical or different, are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine;

$R^3$ and $R^4$ are hydrogen atoms;

$R^5$ and $R^6$ are identical or different, preferably identical, are one of a hydrogen atom, halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$ -arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, preferably a chlorine atom, a $C_1$–$C_{10}$ alkyl group, preferably a $_1$–$C_3$ alkyl group, or a $C_6$–$C_{10}$ aryl group, preferably a $C_6$–$C_9$ aryl group, $R^7$ is

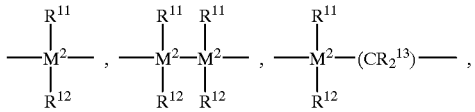

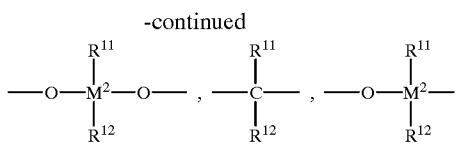

$=BR^{11}$, $=AIR^{11}$, —Ge—, —Sn—, —O—, —S—, $=SO$, $=SO_2$, $=NR^{11}$, $=CO$, $PR^{11}$, or $=P(O)R^{11}$;

wherein:

$R^{11}$, $R^{12}$ and $R^{13}$ are identical or different and are a hydrogen atom, a halogen atom, a $C_1$–$C_{20}$ alkyl group, preferably a $C_1$–$C_{10}$ alkyl group, a $C_1$–$C_{20}$ fluoroalkyl group, preferably a $C_1$–$C_{10}$ fluoroalkyl group, a $C_6$–$C_{30}$ aryl group, preferably a $C_6$–$C_{20}$ aryl group, a $C_6$–$C_{30}$ fluoroaryl group, preferably a $C_6$–$C_{20}$ fluoroaryl group, a $C_1$–$C_{20}$ alkoxy group, preferably a $C_1$–$C_{10}$ alkoxy group, a $C_2$–$C_{20}$ alkenyl group, preferably a $C_2$–$C_{10}$ alkenyl group, a $C_7$–$C_{40}$ arylalkyl group, preferably a $C_7$–$C_{20}$ arylalkyl group, a $C_8$–$C_{40}$ arylalkenyl group, preferably a $C_8$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^{10}$ are identical or different and have the meanings stated for $R^{11}$, $R^{12}$ and $R^{13}$. Two adjacent $R^{10}$ radicals can be joined together to form a ring system, preferably a ring system containing from about 4–6 carbon atoms.

Alkyl refers to straight or branched chain substituents. Halogen (halogenated) is fluorine, chlorine, bromine or iodine atoms, preferably fluorine or chlorine.

Particularly preferred metallocenes are compounds of the structures:

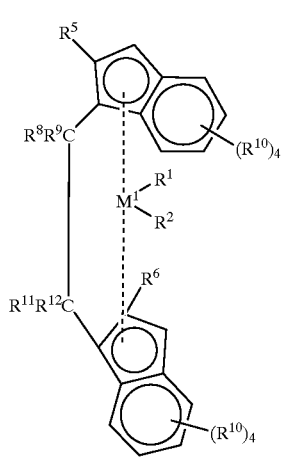

(A)

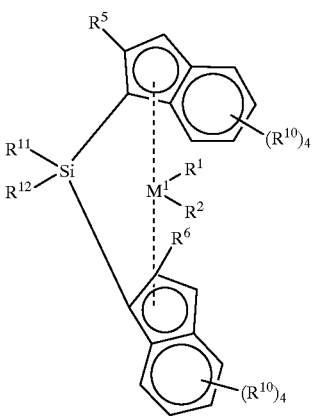

(B)

wherein:

$M^1$ is Zr or Hf, $R^1$ and $R^2$ are methyl or chlorine, and $R^5$, $R^6$ $R^8$, $R^9$,$R^{10}$,$R^{11}$ and $R^{12}$ have the above-mentioned meanings.

The chiral metallocenes may be used as a racemate for the preparation of highly isotactic polypropylene polymers and copolymers. It is also possible to use the pure R or S form. An optically active polymer can be prepared with these pure stereoisomeric forms. Preferably the meso form of the metallocene is removed to ensure the center (i.e., the metal atom) provides stereoregular polymerization. Separation of the stereoisomers can be accomplished by known literature techniques. For special products it is also possible to use rac/meso mixtures.

Methods for preparing metallocenes of the present invention are fully described in the *Journal of Organometallic Chem.*, volume 288, (1958), pages 63–67, and in EP-A-320762, for preparation of the metallocenes described, both of which are herein fully incorporated by reference.

Illustrative but non-limiting examples of some preferred metallocenes include:
Dimethylsilanylbis(2-methyl-4phenyl-1-indenyl)ZrCl$_2$
Dimethylsilanylbis(2-methyl-4,5-benzoindenyl)ZrCl$_2$;
Dimethylsilanylbis(2-methyl-4,6-diisopropylindenyl)ZrCl$_2$;
Dimethylsilanylbis(2-ethyl-4-phenyl-1-indenyl)ZrCl$_2$;
Dimethylsilanylbis(2-ethyl-4-naphthyl-1-indenyl)ZrCl$_2$;
Phenyl(Methyl)silanylbis(2-methyl-4-phenyl-1-indenyl) ZrCl$_2$,
Dimethylsilanylbis(2-methyl-4-(1-naphthyl)-1-indenyl) ZrCl$_2$,
Dimethylsilanylbis(2-methyl-4-(2-naphthyl)-1-indenyl) ZrCl$_2$,
Dimethylsilanylbis(2-methyl-indenyl)ZrCl$_2$,
Dimethylsilanylbis(2-methyl-4,5-diisopropyl-1-indenyl) ZrCl$_2$,
Dimethylsilanylbis(2,4,6-trimethyl-1-indenyl)ZrCl$_2$,
Phenyl(Methyl)silanylbis(2-methyl-4,6-diisopropyl-1-indenyl)ZrCl$_2$,
1,2-Ethandiylbis(2-methyl-4,6-diisopropyl-1-indenyl) ZrCl$_2$,
1,2-Butandiylbis(2-methyl-4,6-diisopropyl-1-indenyl) ZrCl$_2$,
Dimethylsilanylbis(2-methyl-4-ethyl-1-indenyl)ZrCl$_2$,
Dimethylsilanylbis(2-methyl-4-isopropyl-1-indenyl)ZrCl$_2$,
Dimethylsilanylbis(2-methyl-4-t-butyl-1-indenyl)ZrCl$_2$,
Phenyl(Methyl)silanylbis(2-methyl-4-isopropyl-1-indenyl) ZrCl$_2$,
Dimethylsilanylbis(2-ethyl-4-methyl-1-indenyl)ZrCl$_2$, Dimethylsilanylbis(2,4-dimethyl-1-indenyl)ZrCl$_2$,
Dimethylsilanylbis(2-methyl-4-ethyl-1-indenyl)ZrCl$_2$,
Dimethylsilanylbis(2-methyl-α-acenaphth-1-indenyl)ZrCl$_2$,
Phenyl(Methyl)silanylbis(2-methyl-4,5-benzo-1-indenyl) ZrCl$_2$, Phenyl(Methyl)silanylbis(2-methyl-4,5-(methylbenzo)-1-indenyl)ZrCl$_2$, Phenyl(Methyl) silanylbis(2-methyl-4,5-(tetramethylbenzo)-1-indenyl) ZrCl$_2$, Phenyl(Methyl)silanylbis (2-methyl-a-acenaphth-1-indenyl)ZrCl$_2$,
1,2-Ethandiylbis(2-methyl-4,5-benzo-1-indenyl)ZrCl$_2$,
1,2-Butandiylbis(2-methyl-4,5-benzo-1-indenyl)ZrCl$_2$,
Dimethylsilanylbis(2-methyl-4,5-benzo-1-indenyl)ZrCl$_2$,
1,2-Ethandiylbis(2,4,7-trimethyl-1-indenyl)ZrCl$_2$,
Dimethylsilanylbis(2-methyl-1-indenyl)ZrCl$_2$,
1,2-Ethandiylbis(2-methyl-1-indenyl)ZrCl$_2$,
Phenyl(Methyl)silanylbis(2-methyl-1-indenyl)ZrCl$_2$,
Diphenylsilanylbis(2-methyl-1-indenyl)ZrCl$_2$,
1,2-Butandiylbis(2-methyl-1-indenyl)ZrCl$_2$,
Dimethylsilanylbis(2-ethyl-1-indenyl)ZrCl$_2$,
Dimethylsilanylbis(2-methyl-5-isobutyl-1-indenyl)ZrCl$_2$,
Phenyl(Methyl)silanylbis(2-methyl-5-isobutyl-1-indenyl) ZrCl$_2$,
Dimethylsilanylbis(2-methyl-5-t-butyl-1-indenyl)ZrCl$_2$,
Dimethylsilanylbis(2,5,6-trimethyl-1-indenyl)ZrCl$_2$, and the like.

Some preferred metallocene catalyst components are described in detail in U.S. Pat. Nos. 5,149,819, 5,243,001, 5,239,022, 5,296,434 and 5,276,208 all of which are herein fully incorporated by reference. In addition, the bis-amido and bis-arylamido transition metal catalysts of U.S. Pat. No. 5,318,935 and copending U.S. patent application Ser. No. 08/803,687, filed Feb. 24, 1997, can be useful in forming the branched polypropylene of the present invention.

Most preferably, the catalyst used to produce the branched polypropylene of the present invention is a substituted dimethylsilyl-bridged bis-indenyl zirconocene or hafnocene such as dimethylsilyl bis(2-methyl-indenyl) ZrCl$_2$, dimethylsilyl bis(2-methyl-indenyl) ZrMe$_2$, dimethylsilyl bis(2-methyl-4-phenyl-1-indenyl) ZrCl$_2$, dimethylsilyl bis(2-methyl-4-(1-naphthyl)-1-indenyl) ZrCl$_2$, or dimethylsilyl bis(indenyl)hafnium dimethyl.

Preferably, the catalysts used to produce the syndiotactic polypropylene of the present invention are those disclosed in U.S. Pat. Nos. 4,892,851, 5,155,080, and 5,132,381, the disclosures of which are hereby incorporated by reference.

The terms "cocatalyst" and "activator" are used herein interchangeably and are defined to be any compound or component which can activate a bulky ligand transition metal compound or a metallocene, as defined above. Alumoxane may be used as an activator. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, each of which is fully incorporated herein by reference. It may be preferable to use a visually clear methylalumoxane. A cloudy or gelled alumoxanie can be filtered to produce a clear solution or clear alumoxane can be decanted from the cloudy solution.

It is also within the scope of this invention to use ionizing activators, neutral or ionic, or compounds such as tri(n-butyl)ammonium tetrakis(pentaflurophenyl)boron, which ionize the neutral metallocene compound. Such ionizing compounds may contain an active proton, or some other cation associated with but not coordinated or only loosely coordinated to the remaining ion of the ionizing compound. Combinations of activators are also contemplated by the invention, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-30 92/00333 (incorporated herein by reference). These teach a preferred method of preparation wherein metallocenes (bisCp and monoCp) are protonated by an anion precursor such that an alkyl/hydride group is abstracted from a transition metal to make it both cationic and charge-balanced by the non-coordinating anion.

The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient liability to permit displacement by an ethylenically or acetylenically unsaturated monomer during polymerization.

The use of ionizing ionic compounds not containing an active proton but capable of producing both the active metallocene cation and an noncoordinating anion is also known. See, EP-A-0 426 637 and EP-A- 0 573 403 (incorporated herein by reference). An additional method of making the ionic catalysts uses ionizing anion precursors which are initially neutral Lewis acids but form the cation and anion upon ionizing reaction with the metallocene compounds, for example the use of tris(pentafluorophenyl) boron. See EP-A-0 520 732 (incorporated herein by reference). Ionic catalysts for addition polymerization can also be prepared by oxidation of the metal centers of transition metal compounds by anion precursors containing metallic oxidizing groups along with the anion groups, see EP-A-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 (incorporated herein by reference) for in situ processes describing the reaction of alkyl aluminum compounds with dihalo-substituted metallocene compounds prior to or with the addition of activating anionic compounds.

Support Materials

The metallocenes described herein may be supported using a porous particulate material, such as for example, talc, inorganic oxides, inorganic chlorides and resinous materials such as polyolefin or polymeric compounds.

Preferred support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesia, titania, zirconia, and the like.

Preferably the support material is porous silica which has a surface area in the range of from about 10 to about 700 m$^2$/g, a total pore volume in the range of from about 0.1 to about 4.0 cc/g and an average particle size in the range of from about 10 to about 500 μm. More preferably, the surface area is in the range of from about 50 to about 500 m$^2$/g, the pore volume is in the range of from about 0.5 to about 3.5 cc/g and the average particle size is in the range of from about 20 to about 200 μm. Most preferably the surface area is in the range of from about 100 to about 400 m$^2$/g, the pore volume is in the range of from about 0.8 to about 3.0 cc/g and the average particle size is in the range of from about 30 to about 100 μm. The average pore size of typical porous support materials is $\geq$10 Å. Preferably, a support material is used that has an average pore diameter of $\geq$50 Å, and most preferably it is in the range of from about 75 to about 350 Å. It may be particularly desirable to dehydrate the silica at a temperature of from about 100° C. to about 800° C. anywhere from about 3 to about 24 hours.

The metallocenes, activator and support material may be combined in any number of ways. Suitable support techniques are described in U.S. Pat. Nos. 4,808,561 and 4,701,432 (each fully incorporated herein by reference.). Preferably the metallocenes and activator are combined and their reaction product supported on the porous support material as described in U.S. Pat. No. 5,240,894 and WO 94/28034, WO 96/00243, and WO 96/00245 (each fully incorporated herein by reference.) Alternatively, the metallocenes may be pre-activated separately and then combined with the support material either separately or together. If the metallocenes are separately supported, then preferably, they are dried then combined as a powder before use in polymerization.

Regardless of whether the metallocene and activator are separately precontacted or whether the metallocene and activator are combined at once, the total volume of reaction solution applied to porous support is preferably less than about 4 times the total pore volume of the porous support, more preferably less than about 3 times the total pore volume of the porous support and even more preferably in the range of from more than about 1 to less than about 2.5 times the total pore volume of the porous support. Procedures for measuring the total pore volume of porous support are well known in the art. The preferred method is described in Volume 1, *Experimental Methods in Catalyst Research*, Academic Press, 1968, pages 67–96.

Methods of supporting ionic catalysts comprising metallocene cations and noncoordinating anions are described in WO 91/09882, WO 94/03506, WO 96/04319 and U.S. Pat. No. 5,643,847 (incorporated herein by reference). The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

The supported catalyst system may be used directly in polymerization or the catalyst system may be prepolymerized using methods well known in the art. For details regarding prepolymerization, see U.S. Pat. Nos. 4,923,833 and 4,921,825, EP 0 279 863 and EP 0 354 893 each of which is fully incorporated herein by reference.

Polymerization Processes

The branched polypropylene of the present invention may be produced using the catalysts described above in any process including gas, slurry, suspension or solution phase or high pressure autoclave processes. Additionally, combinations of the above reactor types in multiple, series reactors and/or multiple reaction conditions and/or multiple catalyst configurations are explicitly intended.

In the preferred embodiment, this invention is directed toward the polymerization of propylene in a slurry or solution phase polymerization process, particularly a slurry polymerization process wherein hydrocarbon is used as the liquid medium.

Typically in a gas phase polymerization process a continuous cycle is employed wherein one part of the cycle of a reactor, a cycling gas stream, otherwise known as a recycle stream or fluidizing medium, is heated in the reactor by the heat of polymerization. The recycle stream usually contains one or more monomers continuously cycled through a fluidized bed in the presence of a catalyst under reactive conditions. This heat is removed in another part of the cycle by a cooling system external to the reactor. The recycle stream is withdrawn from the fluidized bed and recycled back into the reactor. Simultaneously, polymer product is withdrawn from the reactor and new or fresh monomer is added to replace the polymerized monomer. (See for example U.S. Pat. Nos. 4,543,399; 4,588,790; 5,028,670; 5,352,749; 5,405,922, and 5,436,304 all of which are fully incorporated herein by reference.)

A slurry polymerization process generally uses pressures in the range of from about 1 to about 500 atmospheres or even greater and temperatures in the range of from –60° C. to about 280° C. In a slurry polymerization, a suspension of solid, particulate polymer is formed in a liquid or supercritical polymerization medium to which propylene and comonomers and often hydrogen along with catalyst are added. The medium employed should be liquid under the conditions of polymerization and relatively inert. The liquid employed in the polymerization medium can be an inert hydrocarbon solvent or diluent. For example, an alkane or a cycloalkane such as hexane or isobutane can be used. In a preferred embodiment, $C_3$–$C_8$ hydrocarbons serve as the polymerization diluent.

Preferably, the propylene monomers and the inert hydrocarbon solvent or diluent comprise at least 50 weight percent of the total contents of the reactor. More preferably, they comprise at least 70 percent of the total contents of the reactor. Still more preferably, the propylene monomers and the inert hydrocarbon solvent or diluent comprise at least 80 percent of the total contents of the reactor. Most preferably, they comprise at least 90 percent of the total contents of the reactor.

Also, the ratio in the reactor of the propylene monomers to the inert hydrocarbon solvent or diluent is preferably less than 9.0. More preferably, the ratio is less than 3.0. Still more preferably, it is less than 2.0 or less than 1.0. And, even more preferably, the ratio in the reactor of the propylene monomers to the inert hydrocarbon solvent or diluent is preferably less than 0.8.

Preferably, the concentration of inert hydrocarbon solvent or diluent is at least 25 weight percent of the total contents of the reactor. More preferably, the inert hydrocarbon solvent or diluent comprises at least 30 weight percent of the total contents of the reactor. Most preferably, the inert hydrocarbon solvent or diluent comprises at least 40 weight percent of the total contents of the reactor.

Preferably, the polymerization is carried out using a pressure of from about 200 kPa to about 7,000 kPa at a temperature in the range of from about 40° C. to about 120° C. More preferably, the polymerization is carried out at a temperature in the range of from about 50° C. to about 100°

C. Most preferably, the polymerization is carried out at a temperature in the range of from 60° C. to 90° C.

In a preferred embodiment, propylene monomers are less than 25 weight percent of the total contents of the polymerization reactor. More preferably, propylene monomers are less than 20 weight percent of the total contents of the polymerization reactor, still more preferably, less than 15 weight percent. Most preferably, propylene monomers are less than 10 weight percent of the total contents of the polymerization reactor.

The polymerization may be conducted in batch, semi-batch or continuous mode and the entire polymerization may take place in one reactor or the polymerization may be carried out in a series of reactors. Preferably, the polymerization is carried out in continuous mode.

The reaction time for the polymerization of the present invention will depend upon the catalyst system and reaction conditions.

The above-described temperatures, reaction times and other conditions are considered suitable polypropylene polymerization conditions for the purposes of this invention.

Hydrogen may be added to the polymerization system as a molecular weight regulator in the first and/or subsequent reactors depending upon the particular properties of the product desired and the specific metallocenes used. When metallocenes having different hydrogen responses are used, the addition of hydrogen will affect the molecular weight distribution of the polymer product accordingly. Hydrogen may also affect the distribution of branching.

For preparation of the branched polypropylene, preactivation of the metallocene may be advantageous. For example, it is widely known in the art that preactivation of the metallocene with alumoxane before addition to a continuous solution-phase reactor yields higher activities than continuous addition of metallocene and activator in two separate streams. Furthermore, it may be advantageous to control precontacting time to maximize catalyst effectiveness, e.g., avoiding excessive aging of the activated catalyst composition.

INDUSTRIAL UTILITY

The branched polypropylene polymers of the present invention exhibit improved melt strength and strain thinning characteristics compared with standard polypropylene. This results in improved processability of the polymers, e.g. increased strain thinning and high output for a constant energy input. These characteristics will result in improved processing in blow molding, sheet extrusion and thermoforming operations. For example, in thermoforming operations sag will be decreased and power consumption will be lowered in the extruders. At least in part for these reasons, the branched polypropylene polymers of the present invention are useful in a variety of applications, including polyolefin blends and impact copolymers, foams, films, thermolded articles and fibers.

In addition, production of the branched polypropylene of the present invention is less complicated than current branched polypropylenes. Prior art processes typically required some type of post-reactor treatment to produce a branched product. The present invention does not need a post-reactor step to produce branched polypropylene.

In order that the invention may be more readily understood, reference is made to the following examples, which are intended to illustrate the invention but not to limit the scope thereof.

EXAMPLES

General

Three reactor types were used for polymer synthesis: batch, semi-batch, and continuous. Monomer feed and catalyst preparation procedures for each were similar. Liquids were measured into the reactors and feed tanks (continuous reactor) using calibrated sight glasses. High purity (>99.5%) hexane, propane, isobutane and toluene were purified by passing first through basic alumina activated at high temperature in nitrogen, followed by molecular sieve activated at high temperature in nitrogen. Propylene was purified by passing it through activated basic alumina and molecular sieves. Methylalumoxane (MAO, 10% in toluene) was received from Albemarle Inc. in stainless steel cylinders, divided into 1-liter glass containers, and stored in a laboratory glove-box at ambient temperature. Dimethylanilinium tetrakis(perfluoroaryl)borate $[DMAH]^+$ $[(C_6F_5)_4B]^-$ was obtained from Boulder Scientific Co., Mead, Colo.

Propylene was measured into the reactor through a calibrated container. To ensure the reaction medium was well-mixed, a flat-paddle stirrer rotating at 750 rpm was used. Polymerization was performed in 0.5 liter (continuous) or 2-liter (batch, semi-batch) Zipperclave reactors equipped with a water jacket for temperature control. The reactors were first cleaned by heating to 120° C. in toluene to dissolve any polymer residues, then cooled and drained. Next, the reactor was heated using jacket water at 110° C. and the reactor was purged with flowing nitrogen for a period of ~30 minutes. Before reaction, the reactor was further purged using 3 nitrogen pressurize/vent cycles (to 100 psi).

Catalysts

All catalyst preparations were performed in an inert atmosphere with <1.5 ppm $H_2O$ content. The metallocenes used in the syntheses were obtained from internal sources. Dimethylsilyl bis(indenyl) metal dimethyl complexes were preactivated with $[DMAH]^+$ $[(C_6F_5)_4 B]^-$, and dimethylsilyl bis(indenyl) metal dichloride catalysts were preactivated with MAO. "Davison 952, calcined at 600° C." represents the commercial silica support product of Grace Davison Inc., which has been calcined at 600° C. under a dry nitrogen flow for 8–24 hours so as to achieve a hydroxyl content of 0.8 to 1.2 mmol/g silica. Catalysts for batch and semi-batch reactions were injected in a single pulse using a stainless steel tube coupled to the reactor. Catalysts for continuous reaction were metered continuously into the reactor from a stainless steel supply bomb (pressurized at 100 psig) using an HPLC pump.

Batch Polymerization with unsupported catalyst (A)

Polymerization reactions were typically conducted in toluene or hexane (300 mL) containing propylene (150 mL). The reactor was heated to the desired temperature and equilibrated for 5 min. The scavenger (TIBAL (0.5 mL of 1M solution in 2 mL of toluene) was added to the reactor through a stainless steel tube. Then the catalyst and activator (in 3 mL of toluene) was injected using a catalyst tube. After 15 min, the reactor was cooled to 25° C. and vented. The polymer was collected by filtration, washed with hexane, and dried in air for 12 hours.

Batch Polymerization with supported catalyst (B)

The supported catalyst D for these polymerization runs was prepared using "Davison 952 silica, calcined at 600° C". In a nitrogen purged dry glove box, the silica, 394.32 g, was massed and placed in a 3-neck 4 L reactor that was fitted with an overhead stirrer. The dry toluene, 2 L, was added and the mixture was stirred vigorously. The N.N-diethylaniline, 27.6 ml, 0.174 mole, was added by using a syringe. The tris(perfluorophenyl)boron, 85.96 g, 0.168 mole, was added as a solid. The above mixture was stirred for 1 hour. The catalyst D, dimethylsilylbis(2-methyl-4-phenyl indenyl) zirconium dimethyl, 5.99 g, 0.0102 mole, was added and the reaction mixture was stirred for additional 2 hours. The solvent was decanted off and the solid was dried under vacuum overnight. Yield: 483 g. Catalyst loading was found to be 0.02 mmol of transition metal per gram of the catalyst. Polymerizations were typically conducted in a 2 L Zipperclave reactor using a mixture of propylene (27–67% by volume) and diluents such as hexane, propane, and i-butane (33–73% by volume). The reactor was heated to the set temperature and equilibrated for 5 min. The scavenger, either tri-isobutyl aluminum (1–3 ml, 1 M solution in hexane) or triethyl aluminum (1 ml, 1 M solution in toluene) was charged to the reactor through a stainless tube. Then the supported catalyst D (100–200 mg in 2 ml of hexane) was injected using a catalyst tube. The polymerization was carried out for 15–60 min after which the reactor was cooled to 25° C. and vented. The polymer was collected by filtration, was washed with hexane, was dried by $N_2$ purge for overnight, and was weighed.

Semi-batch Polymerization

Semi-batch reactions were similar to batch polymerization except propylene was added slowly (2.5 ml/min or 5.0 ml/min) using an HPLC pump. Each run began with 1 liter of toluene, 0.5 ml TIBAL (0.5 mL of 1M solution in 2 mL of toluene) and catalyst/MAO at the desired temperature. Runs commenced with the continuous pumping of propylene. A steady state was achieved in less than ten minutes, as measured by a leveling of reactor pressure. At this point, the rate of propylene consumption approximately equals the rate of propylene injection.

Continuous Polymerization

A fully instrumented 0.5 liter Zipperclave reactor was used for continuous reaction experiments. [DMAH]$^+$ [(C$_6$F$_5$)$_4$ B]$^-$-activated catalysts were used in these reactions due to the tendency of MAO to foul the pumps and feed lines. Each run utilized 30 mg of Hf-SS (1:1.3 molar [DMAH]$^+$ [(C$_6$F$_5$)$_4$ B]$^-$) in 100 ml toluene, preactivated 15 minutes before loading into the feed bomb for injection/metering by the HPLC pump. Hexane and propylene were premixed in an 18 liter feed tank. After addition of the materials, the feed tank was closed, then pressurized with nitrogen to 200 psig. A positive displacement pump was used to meter the feed into the reactor and to raise the pressure sufficiently to prevent bubbling of the reaction medium at reaction temperatures. In this way, liquid-full reaction was accomplished. Reactor pressure was controlled using a downstream back-pressure regulator.

Thermal and GPC Analysis

Melting and crystallization temperatures of the polymers were measured on a TA Instrument DSC-912 using a heating and cooling rate of 10° C./min. The melting temperatures reported were obtained from the second melt. The molecular weight and MWD of the polymers were measured by a Waters 150-C ALC/GPC.

Branching levels were measured by GPC/V is and are reported as g' at each molecular weight in the GPC trace. Relating the measured g' to branched structure requires the application of Zimm-Stockmayer theory, which assumes a random distribution of branch sizes for each population of branched structures (singly, doubly, triply branched, etc.) at each molecular weight. See B. H. Zimm and W. H. Stockmayer, J. Chem. Phys. 17, 1301 (1949).

Rheology

The melt viscoelasticity data were obtained using a Rheometric Scientific RMS-800 in parallel plate oscillatory strain mode at 180° C. from 0.1 to 400 rad/sec. The polymers were stabilized with 0.1–0.2 wt % of BHT prior to compression molding and evaluation for rheology and mechanical properties.

Rheology data analysis

The raw data are the evolution of the tensile force versus time, F(t), which has to be converted into extensional viscosity values. The elongational stress and elongational viscosities are given respectively by $$\sigma(t) = \frac{F(t)}{S(t)} \text{ and } \eta_E(t) = \frac{\sigma(t)}{\dot{\varepsilon}} \quad [1]$$

where S(t) is the sample cross-section and $\epsilon$ the elongation rate. Instead of using the command value on the instrument, the latter quantity was determined by an image analysis procedure. In homogeneous stretching conditions, the sample length exponentially increases with time. Assuming isovolume conditions (incompressible melt), S(t) therefore decays exponentially:

$$S(t) = S_0 \exp(-\dot{\varepsilon}t) \quad [2]$$

It is more convenient to measure the sample width l(t). Under uniaxial deformation, it is expressed by:

$$l(t) = l_0 \exp\left(-\frac{\dot{\varepsilon}t}{2}\right) \quad [3]$$

Throughout a run, a plot of $[-2 \ln (l(t)/l_0]$ as a function of time should be a straight line with a slope equal to $\epsilon$. True elongational rates were determined according to this procedure for each test.

In addition, Eqs [1]–[3] were applied only if the two following criteria were verified:

force values higher than the minimum transducer resolution (0.2 cN). This is sometimes not achieved at start-up of the test if the sample is slightly bent between the rotating belts. If so, the first valid force measurement is taken as a corrected time origin. Similar problem might also happen at long times when the force decreases due to the reduction in cross-section.

homogeneous deformation, i.e. no neck-in, and no deviation from linearity in the plots of [−2 ln (l(t)/b] vs time.

In case of failure of only one of these criteria, the corresponding F(t) values are not converted into elongational viscosity data, as the conversion would not be reliable. The second criterion is generally the most severe.

Linear viscoelastic predictions

For the sake of comparison, it is useful to plot the experimental data together with the predictions of linear viscoelasticity, which can be independently evaluated by strain oscillatory experiments. These experiments have been performed on a RMS800 or a SR-500 from Rheometric Scientific. Discrete relaxation spectra were calculated with the method of Baumgaertel and Winter using Iris software. Transient elongational viscosity were then computed as 3 times the strain value, i.e.

$$\bar{\eta}_E(t) = 3\sum_i g_i \lambda_i \left(1 - \exp\left(\frac{-t}{\lambda_i}\right)\right)$$

Examples 1–11

Batch reactions were performed over a range of temperatures, propylene concentrations, and reaction times. The results are presented in Table 1. Each variable has a significant effect on the polymer molecular weight and Mw/Mn. Highest molecular weight was obtained using catalyst A at low temperature and high propylene concentrations. Conversely, high temperature catalyst B at low propylene concentrations gives the lowest molecular weight.

Examples 12–21

Batch reactions using supported metallocene catalyst in iso-butane and propane slurry were performed. The data from these runs is presented in Table 2.

Examples 22–24

Semi-batch reactions were undertaken in order to maximize branching via reactions with very low monomer concentrations, high catalyst concentrations and large accumulations of polymeric macromer. The data from these runs is presented in Table 3.

Examples 25–30

Additional semi-batch reactions were carried out and hexane was used as solvent. The propylene partial pressure was controlled at 50 psi. The data from these runs is presented in Table 4. Also, several of the polymers produced in these runs were analyzed by $^{13}C$ NMR. The data is presented in Table 6.

Examples 31–51

Experiments were run using continuous polymerization conditions. The data from these runs is presented in Table 5.

TABLE 1

Batch Reactor Syntheses of Branched Polypropylene Compositions

| Example | Catalyst | Rxn time (min) | Temp (° C.) | Feed (in hexane) | Mn | Mw | Mz | Mw/Mn |
|---|---|---|---|---|---|---|---|---|
| 1 | A | 15 | 50 | C3, 15% | 162824 | 306393 | 518973 | 1.88 |
| 2 | A | 15 | 50 | C3, 30% | 241335 | 429345 | 677277 | 1.78 |
| 3 | A | 15 | 60 | C3, 15% | 131257 | 249857 | 399416 | 1.90 |
| 4 | A | 15 | 70 | C3, 15% | 98852 | 174906 | | 1.77 |
| 5 | A | 15 | 80 | C3, 15% | 83345 | 161758 | 282858 | 1.94 |
| 6 | A | 15 | 90 | C3, 15% | 29828 | 58112 | 92557 | 1.95 |
| 7 | B | 15 | 50 | C3, 15% | 92039 | 154267 | 233897 | 1.68 |
| 8 | B | 12 | 60 | C3, 30% | 72900 | 132900 | 211300 | 1.82 |
| 9 | B | 30 | 60 | C3, 15% | 73900 | 151100 | 242200 | 2.04 |
| 10 | B | 15 | 90 | C3, 15% | 24396 | 46252 | 72991 | 1.90 |
| 11 | C | 15 | 55 | C3, 15% | 53369 | 142316 | 315321 | 2.67 |

Catalysts:
A = Dimethylsilyl bis(indenyl)Hf dimethyl preactivated by $[DMAH]^+[(C_6F_5)_4B]^-$.
B = Dimethylsilyl bis(2-methyl-indenyl)$ZrCl_2$ preactivated by MAO.
C = Dimethylsilyl bis(2-methyl-4-phenyl-indenyl)$ZrCl_2$ preactivated by MAO.

TABLE 2

Batch Reactor Syntheses of Branched Polypropylene Compositions Using Supported metallocene catalyst

| Example | Solvent | Catalyst | Rxn time (min) | Temp (° C.) | Feed | Mn | Mw | Mz | Mw/Mn |
|---|---|---|---|---|---|---|---|---|---|
| 12 | i-Butane | D | 60 | 70 | C3, 33% | 119800 | 289000 | 552000 | 2.41 |
| 13 | i-Butane | D | 60 | 70 | C3, 50% | 193700 | 533000 | 1017000 | 2.75 |
| 14 | i-Butane | D | 60 | 70 | C3, 67% | 190500 | 475000 | 895800 | 2.49 |
| 15 | i-Butane | D | 60 | 90 | C3, 33% | 84700 | 296400 | 678900 | 3.50 |
| 16 | i-Butane | D | 60 | 90 | C3, 50% | 91100 | 298200 | 658300 | 3.27 |
| 17 | i-Butane | D | 60 | 90 | C3, 67% | 108300 | 336100 | 712600 | 3.10 |
| 18 | Propane | D | 60 | 70 | C3, 33% | 136800 | 346300 | 669300 | 2.53 |
| 19 | Propane | D | 60 | 75 | C3, 31% | 102600 | 262600 | 544100 | 2.56 |
| 20 | Propane | D | 60 | 75 | C3, 50% | 105900 | 314000 | 628600 | 2.97 |
| 21 | Propane | D | 60 | 75 | C3, 67% | 158800 | 409200 | 790000 | 2.58 |

D = dimethylsilyl bis (2-methyl-4-phenyl-indenyl) zirconium dimethyl on silica.

TABLE 3

Semi-Batch Reactor Syntheses of Branched Polypropylene Compositions

| Example | Catalyst | Rxn time (min) | Temp (° C.) | Feed Rate (mL/min) | Mn | Mw | Mz | Mw/Mn |
|---|---|---|---|---|---|---|---|---|
| 22 | B | 120 | 60 | 2.5 | 35800 | 79900 | 137400 | 2.23 |
| 23 | B | 50 | 60 | 5 | 42600 | 86300 | 137800 | 2.03 |
| 24 | B | 46 | 90 | 5 | 14900 | 34100 | 63300 | 2.29 |

TABLE 4

Semi-Batch Reactor Syntheses of Branched Polypropylene Compositions

| Example | Catalyst | Rxn time (min) | Temp (° C.) | Feed Rate (mL/min) | Mn | Mw | Mz | Mw/Mn |
|---|---|---|---|---|---|---|---|---|
| 25 | C | 60 | 60 | 3 | 42459 | 99331 | 195199 | 2.34 |
| 26 | C | 60 | 60 | 3 | 51486 | 120955 | 234550 | 2.35 |
| 27 | C | 60 | 55 | 3 | 55683 | 119785 | 216930 | 2.15 |
| 28 | C | 60 | 55 | 3 | 83687 | 191352 | 367319 | 2.29 |
| 29 | C | 72 | 50 | 3 | 107752 | 242796 | 471383 | 2.25 |
| 30 | C | 90 | 50 | 3 | 142271 | 294431 | 540919 | 2.07 |

TABLE 5

Continuous Reactor Syntheses of Branched Polypropylene Compositions

| Example | Catalyst | Temp (C) | feed flow (g/min) | C3 conv (%) | yield (g/min) | Mn | Mw | Mz | Mw/Mn |
|---|---|---|---|---|---|---|---|---|---|
| 31 | A | 110 | 19.27 | 33.7 | 6.5 | 5210 | 15100 | 24800 | 2.89 |
| 32 | A | 90 | 19.27 | 46.2 | 8.9 | 8460 | 33500 | 63900 | 3.96 |
| 33 | A | 70 | 19.27 | 49.3 | 9.5 | 23000 | 96400 | 162000 | 4.19 |
| 34 | E | 110 | 19.27 | 52.4 | 10.1 | 2600 | 4260 | 6540 | 1.64 |
| 35 | E | 90 | 19.27 | 55.5 | 10.7 | 4160 | 8250 | 13500 | 1.98 |
| 36 | E | 70 | 19.27 | 56.0 | 10.8 | 9410 | 20000 | 33500 | 2.12 |
| 37 | E | 60 | 19.27 | 51.3 | 9.9 | 22900 | 44900 | 71300 | 1.96 |
| 38 | E | 70 | 19.27 | 58.6 | 11.3 | 28400 | 56700 | 91600 | 1.99 |
| 39 | E | 70 | 19.27 | 66.4 | 12.8 | 20100 | 36600 | 56900 | 1.82 |
| 40 | E | 70 | 19.27 | 68.5 | 13.2 | 13300 | 27100 | 43600 | 2.03 |
| 41 | E | 70 | 19.27 | 66.9 | 12.9 | 10500 | 21500 | 35500 | 2.04 |
| 42 | A | 70 | 19.27 | 31.1 | 6.0 | 69000 | 129200 | 205900 | 1.87 |
| 43 | A | 70 | 19.27 | 28.0 | 5.4 | 77700 | 144200 | 230000 | 1.85 |
| 44 | A | 110 | 19.27 | 46.7 | 9.0 | 10000 | 21100 | 35200 | 2.11 |
| 45 | A | 90 | 19.27 | 51.9 | 10.0 | 28200 | 56500 | 89500 | 2.00 |
| 46 | A | 80 | 19.27 | 49.8 | 9.6 | 47400 | 89100 | 139300 | 1.88 |
| 47 | A | 80 | 19.27 | 42.0 | 8.1 | 39800 | 77700 | 124200 | 1.95 |
| 48 | A | 80 | 19.27 | 31.1 | 6.0 | 43400 | 89500 | 145100 | 2.06 |
| 49 | A | 80 | 19.27 | 37.4 | 7.2 | 45700 | 85800 | 135700 | 1.87 |
| 50 | A | 80 | 19.27 | 36.3 | 7.0 | 40900 | 87800 | 145300 | 2.14 |
| 51 | A | 80 | 19.27 | 40.5 | 7.8 | 33100 | 81000 | 135400 | 2.44 |

Catalysts:
A = Dimethylsilyl bis(indenyl)Hf dimethyl preactivated by [DMAH]$^+$[(C$_6$F$_5$)$_4$B]$^-$
E = Dimethylsilyl bis(2-methyl-indenyl)Zr dimethyl preactivated by [DMAH]$^+$[(C$_6$F$_5$)$_4$B]$^-$

TABLE 6

$^{13}$C NMR Analysis of Branched Polypropylene Compositions

| Example | Regio Defects (per 1000 monomer)* 2,1-Addition | 1,3-Addition | Stereo defects (per 1000 monomer) | Avg. Meso Run Length | [mmmm]Pentads (mole Fraction) |
|---|---|---|---|---|---|
| 26 | 2.6 | 1.6 | 5.6 | 102 | 0.9589 |
| 28 | 3.2 | 1.1 | 4.2 | 117 | 0.9668 |
| 30 | 3.5 | 0.4 | 2.7 | 151 | 0.9761 |

*End group corrected.

Several samples from the preceding experiments were analyzed to determine their level of branching. The results of these analyses are presented in Table 7. The branching Index (g) is defined as:

$$g_i = \frac{Rg_i^{2\,branched}}{Rg_i^{2\,linear}}$$

where $Rg_{i\,branched}^2$ is the measured mean square radius of gyration of branched polymer fraction i and $Rg_{i\,linear}^2$ is the mean square radius of gyration of linear polymer of the same molecular weight as the average MW for the branched polymer fraction i. The average value of g is defined as:

$$g_{avg} = \frac{\sum_i Ci\left(\frac{Rg_i^{2\,branched}}{Rg_i^{2\,linear}}\right)}{\sum_i Ci}$$

where Ci is the concentration of polymer in fraction i as measured by DRI, provided fractions i are obtained at regular time intervals while the entire polymer sample elutes. $Rg_{i\,linear}^2 = [K(Mw)_i^\alpha]^2$, and K and α are the measured values for linear isotactic polypropylene (herein K=1.419×10⁻² and α=0.5952).

TABLE 7

Branching Index (g) of Branched polypropylene compositions

| Example | g_avg,(100 k-2M) | g_MW | g_avg,(Mw-2M) | g_Mz | g_avg,(Mz-2M) |
|---|---|---|---|---|---|
| 12 | 0.98 | 1.0 | 0.94 | 0.95 | 0.88 |
| 13 | 0.99 | 0.99 | 0.93 | 0.90 | 0.88 |
| 15 | 0.88 | 0.92 | 0.79 | 0.76 | 0.70 |
| 16 | 0.90 | 0.94 | 0.84 | 0.82 | 0.77 |
| 17 | 0.95 | 0.99 | 0.91 | 0.88 | 0.83 |
| 19 | 0.96 | 0.98 | 0.90 | 0.90 | 0.82 |
| 20 | 0.96 | 0.99 | 0.91 | 0.91 | 0.84 |
| 21 | 0.96 | 0.99 | 0.91 | 0.92 | 0.87 |
| 25 | 0.57 | 0.65 | 0.57 | 0.58 | 0.52 |
| 26 | 0.66 | 0.76 | 0.65 | 0.67 | 0.57 |
| 28 | 0.76 | 0.80 | 0.72 | 0.74 | 0.68 |
| 29 | 0.83 | 0.89 | 0.79 | 0.80 | 0.73 |
| 30 | 0.85 | 0.89 | 0.80 | 0.81 | 0.76 |

The product of Example 29 was analyzed to determine its strain hardening behavior. Extensional viscosity was recorded over time at various strain rates. Also, linear viscoelasticity was calculated for these conditions. The results are presented in Tables 8–10.

The ratio of the extensional viscosity of the branched polypropylene product at break to linear viscoelasticity can be calculated for each of the strain rates. For a strain rate of 0.1, the ratio is 12.82 (681,155.5 to 53,118.11). For a strain rate of 0.3, the ratio is 6.97 (291,447.8 to 41,792.18). For a strain rate of 1.0, the ratio is 5.92 (167,737.2 to 28,348.96).

TABLE 8

Extensional Viscosity and Linear Viscoelasticity for the Product of Example 29 at a Strain rate of 0.1 l/s

| Time (s) | Extensional Vis. (Pa · s) | Linear Vis. (Pa · s) |
|---|---|---|
| 2.139405 | 27857.8 | 23326.08 |
| 2.444173 | 29821.6 | 24480.87 |
| 3.190139 | 34156.13 | 26879.02 |
| 3.644588 | 36376.28 | 28121.74 |
| 4.163775 | 38943.15 | 29391 |
| 5.434566 | 44210.37 | 31991.62 |
| 6.208744 | 46673.46 | 33311.4 |
| 7.093206 | 49597.04 | 34636.31 |
| 8.103663 | 52930.89 | 35961.84 |
| 10.57692 | 62272.32 | 38605.47 |
| 12.08364 | 68358.86 | 39922.51 |
| 13.80501 | 75112.89 | 41236.18 |
| 15.77159 | 84628.98 | 42544.93 |
| 18.01832 | 95763.79 | 43844.88 |
| 23.51755 | 138063.4 | 46391.18 |
| 30.69514 | 234414.7 | 48810.52 |
| 35.0678 | 330643.6 | 49955.75 |
| 40.06336 | 458875.7 | 51054.48 |
| 45.77055 | 602663 | 52107.71 |
| 52.29077 | 681155.5 | 53118.11 |

TABLE 9

Extensional Viscosity and Linear Viscoelasticity for the Product of Example 29 at a Strain rate of 0.3 l/s

| Time (s) | Extensional Vis. (Pa · s) | Linear Vis. (Pa · s) |
|---|---|---|
| 0.1 | 5808.221 | 5848.135 |
| 0.111712 | 6235.598 | 6196.706 |
| 0.173984 | 6109.916 | 7767.911 |
| 0.270966 | 9590.685 | 9658.57 |
| 0.422009 | 13908.88 | 11891.62 |
| 0.657246 | 17712.65 | 14484.47 |
| 0.916291 | 21278.51 | 16692.58 |
| 1.023611 | 22561.95 | 17481.08 |
| 1.427052 | 27068.91 | 19995.17 |
| 1.780915 | 30263.6 | 21783.48 |
| 2.222524 | 34253.62 | 23653.59 |
| 3.0985 | 41388.46 | 26610.85 |
| 4.319729 | 50515.92 | 29745.62 |
| 5.390882 | 60247.08 | 31911.93 |
| 7.51562 | 89720.07 | 35212.18 |
| 9.37925 | 132895.9 | 37414.3 |
| 11.705 | 213273.3 | 39607.96 |
| 13.07595 | 266721.3 | 40701.46 |
| 14.60746 | 291447.8 | 41792.18 |
| 16.31836 | 232334.8 | 42878.63 |

TABLE 10

Extensional Viscosity and Linear Viscoelasticity for the Product of Example 29 at a Strain rate of 1.0 l/s

| Time (s) | Extensional Vis. (Pa · s) | Linear Vis. (Pa · s) |
|---|---|---|
| 0.1 | 6760.698 | 5846.135 |
| 0.109001 | 7186.192 | 6117.951 |
| 0.15387 | 8952.842 | 7302.079 |
| 0.217208 | 10729.18 | 8672.645 |
| 0.306619 | 13081.05 | 10246.9 |
| 0.432834 | 16010.62 | 12029.82 |
| 0.51426 | 17613.22 | 13001.82 |
| 0.611004 | 19502.32 | 14030.9 |
| 0.725948 | 21401.56 | 15120.43 |
| 0.862515 | 23839.07 | 16273.03 |
| 1.024774 | 26692.31 | 17489.3 |
| 1.217557 | 30319.01 | 18767.17 |
| 1.446607 | 35012.72 | 20102.59 |
| 1.718747 | 41666.59 | 21491.02 |
| 2.426245 | 69594.63 | 24416.27 |
| 2.882677 | 99651.99 | 25952.61 |
| 3.424974 | 146033 | 27538.33 |
| 3.733258 | 167737.2 | 28348.96 |
| 4.06929 | 118947 | 29170.5 |
| 4.435569 | 8047.642 | 30001.84 |

A figure is provided to demonstrate the degree of branching of polymers produced by the present invention. FIG. 1 is a graphic illustration of the relationship between the Radius of Gyration ($R_g$) and the molecular weight for the polymer product produced in Examples 26, 28 and 30.

While certain representative embodiments and details have been shown for the purposes of illustrating the invention, it will be apparent to those skilled in the art that various changes in the process and products disclosed herein may be made without departing from the scope of the invention, which is defined in the appended claims.

We claim:

1. A branched polypropylene composition having a polydispersity of less than or equal to 4.0 and a melting point greater than 90° C. wherein the weight average branching index, g, of said branched polypropylene composition is less than 0.95.

2. The branched polypropylene composition of claim 1 wherein the polydispersity of said branched polypropylene is less than or equal to 3.0.

3. The branched polypropylene composition of claim 1 wherein the weight average branching index, g, of said branched polypropylene composition is less than 0.90.

4. The branched polypropylene composition of claim 1 wherein the weight average branching index, g, of said branched polypropylene composition is less than 0.85.

5. The branched polypropylene composition of claim 1 wherein the strain hardening ratio of said branched polypropylene composition is greater than 2.0 for strain rates of 0.1 to 0.5 1/s.

6. A process for producing a branched polypropylene composition comprising:
   a) contacting propylene monomers in a reactor with an inert hydrocarbon solvent or diluent and a catalyst composition comprising one or more single site catalyst compounds capable of producing stereospecific polypropylene at a temperature from about 40° C. to about 120° C., wherein the volume ratio in the reactor of said propylene monomers to said inert hydrocarbon solvent or diluent is less than 9.0, and further, wherein said propylene monomers and said inert hydrocarbon solvent or diluent comprise at least 50 percent of the total contents of said reactor; and
   b) recovering a branched polypropylene composition having a polydispersity of less than or equal to 4.0 and a melting point greater than 90° C. wherein the weight average branching index, g, of said branched polypropylene composition is less than 0.95.

7. The process of claim 6 wherein said one or more single site catalyst compounds are capable of producing isotactic polypropylene.

8. The process of claim 6 wherein said one or more single site catalyst compounds comprise one or more metallocene catalyst compounds.

9. The process of claim 7 or 8 wherein step a) is conducted by a process in which said propylene monomers are contacted with said one or more metallocene catalyst compounds activated by an alumoxane cocatalyst or non-coordinating anion precursor.

10. The process of claim 9 wherein said catalyst composition is supported.

11. The process of claim 8 wherein said one or more metallocene catalyst compounds are selected from the group consisting of substituted dimethylsilyl-bridged bis-indenyl zirconocenes and hafnocenes.

12. The process of claim 8 wherein said catalyst composition consists of a substituted dimethylsilyl-bridged bis-indenyl zirconocene activated with an alumoxane cocatalyst.

13. The process of claim 11 wherein said dimethylsilyl-bridged bis-indenyl zirconocene is dimethylsilyl bis (2-methyl-4-phenylindenyl) zirconium dichloride.

14. The process of claim 12 wherein said dimethylsilyl-bridged bis-indenyl zirconocene is dimethylsilyl bis (2-methyl-4-phenylindenyl)zirconium dimethyl.

15. The process of claim 6 wherein the polydispersity of said branched polypropylene is less than or equal to 3.0.

16. The process of claim 6 wherein step a) is conducted by a process in which said propylene monomers and said inert hydrocarbon solvent or diluent comprise at least 80 weight percent of the total contents of said reactor.

17. The process of claim 6 wherein step a) is conducted by a process in which said propylene monomers and said inert hydrocarbon solvent or diluent comprise at least 90 percent of the total contents of said reactor.

18. The process of claim 6 wherein said propylene monomers in step a) are contacted at a temperature from 50° C. to 100° C.

19. The process of claim 6 wherein said propylene monomers in step a) are contacted at a temperature from 60° C. to 90° C.

20. The process of claim 6 wherein the ratio in the reactor of said propylene monomers to said inert hydrocarbon solvent or diluent is less than 3.0.

21. The process of claim 6 wherein the ratio in the reactor of said propylene monomers to said inert hydrocarbon solvent or diluent is less than 1.0.

22. The process of claim 6 wherein the ratio in the reactor of said propylene monomers to said inert hydrocarbon solvent or diluent is less than 0.8.

23. The process of claim 6 wherein said process is continuous.

24. A branched polypropylene composition produced by the process of:
   a) contacting propylene monomers in a reactor with an inert hydrocarbon solvent or diluent and a catalyst composition comprising one or more single site catalyst compounds capable of producing stereospecific polypropylene at a temperature from about 40° C. to about 120° C., wherein the volume ratio in the reactor of said propylene monomers to said inert hydrocarbon solvent or diluent is less than 9.0, and further, wherein said propylene monomers and said inert hydrocarbon solvent or diluent comprise at least 50 weight percent of the total contents of said reactor; and
   b) recovering a branched polypropylene composition having a polydispersity of less than or equal to 4.0 and a melting point greater than 90° C. wherein the weight average branching index, g, of said branched polypropylene composition is less than 0.95.

25. The branched polypropylene composition of claim 24 wherein said propylene monomers in step a) are contacted at a temperature from 50° C. to 100° C.

26. The branched polypropylene composition of claim 24 wherein said one or more single site catalyst compounds are selected from the group consisting of substituted dimethylsilyl-bridged bis-indenyl zirconocenes and hafnocenes.

27. The branched polypropylene composition of claim 24 wherein the ratio in the reactor of said propylene monomers to said inert hydrocarbon solvent or diluent is less than 1.0.

28. A polyolefin blend comprising the branched polypropylene composition of claim 24.

* * * * *